US011595871B2

(12) United States Patent
Mehta et al.

(10) Patent No.: US 11,595,871 B2
(45) Date of Patent: Feb. 28, 2023

(54) SYSTEMS AND METHODS FOR SECURELY SHARING CONTEXT BETWEEN MEC CLUSTERS

(71) Applicant: Verizon Patent and Licensing Inc., Basking Ridge, NJ (US)

(72) Inventors: Neil S. Mehta, East Hanover, NJ (US); Yuk Lun Li, Morganville, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 260 days.

(21) Appl. No.: 15/930,758

(22) Filed: May 13, 2020

(65) Prior Publication Data

US 2021/0360500 A1 Nov. 18, 2021

(51) Int. Cl.
*H04W 36/12* (2009.01)
*H04W 36/38* (2009.01)
(Continued)

(52) U.S. Cl.
CPC ........ *H04W 36/12* (2013.01); *G06F 9/45533* (2013.01); *H04L 9/3236* (2013.01); *H04L 9/3247* (2013.01); *H04W 12/08* (2013.01); *H04W 36/385* (2013.01); *G06F 21/6254* (2013.01); *H04L 9/50* (2022.05)

(58) Field of Classification Search
CPC ... H04W 36/12; H04W 12/08; H04W 36/385; H04W 36/0033; G06F 9/45533; G06F 21/6254; G06F 2009/45562; G06F 9/45558; G06F 21/6218; G06F 21/53; H04L 9/3236; H04L 9/3247; H04L 2209/38; H04L 9/3239; H04L 41/046; H04L 41/0893; H04L 43/0817; H04L 41/0806
See application file for complete search history.

(56) References Cited

U.S. PATENT DOCUMENTS

2012/0324443 A1* 12/2012 Low .................. G06F 9/5088 718/1
2014/0032706 A1* 1/2014 Kuscher ............... G06F 9/4856 709/217

(Continued)

OTHER PUBLICATIONS

DMTF, DSP2017 Open Virtualization Format White Paper, Apr. 24, 2014, pp. 34-37, 44-45 (Year: 2014).*

*Primary Examiner* — Robert B Leung
*Assistant Examiner* — Bruce S Ashley (57) ABSTRACT

A first network device may receive a notification over a network; in response to the notification, cause a virtualized operating system (OS) and a hypervisor of the first network device to obtain state units from one or more of first hardware components and virtual components; create a context state transfer package (CSTP) based on the state units; and forward the CSTP from the first network device to a second network device over the network. The second network device may receive the CSTP from the first network device; unpack the CSTP to obtain the state units; and put, at the second network device, second hardware components and virtual components of the second network device in a same state as the first hardware components and virtual components when the state units were obtained at the first network device.

20 Claims, 9 Drawing Sheets

(51) Int. Cl.
*H04W 12/08* (2021.01)
*H04L 9/32* (2006.01)
*G06F 9/455* (2018.01)
*G06F 21/62* (2013.01)
*H04L 9/00* (2022.01)

(56) References Cited

U.S. PATENT DOCUMENTS

| | | | |
|---|---|---|---|
| 2016/0105321 A1* | 4/2016 | Thakkar | H04L 41/0853 |
| | | | 709/220 |
| 2017/0295180 A1* | 10/2017 | Day | G07C 9/28 |
| 2019/0026467 A1* | 1/2019 | Suryanarayana | G06F 21/57 |
| 2019/0281132 A1* | 9/2019 | Sethuraman | H04L 9/3247 |
| 2021/0168203 A1* | 6/2021 | Parulkar | H04L 67/1085 |

\* cited by examiner

SYSTEMS AND METHODS FOR SECURELY SHARING CONTEXT BETWEEN MEC CLUSTERS

BACKGROUND INFORMATION

To satisfy the needs and demands of users of mobile communication devices, providers of wireless communication services continue to improve available services. One enhancement is the use of Multi-access Edge Computing (MEC) clusters (also referred to as Mobile Edge Computing clusters). The MEC clusters allow high network computing loads to be transferred onto edge servers. Depending on the location of the edge servers relative to the point of attachment (e.g., a wireless station for a user device), MEC clusters can provide various services and applications to user devices with minimal latency.

DETAILED DESCRIPTION OF PREFERRED EMBODIMENTS

The following detailed description refers to the accompanying drawings. The same reference numbers in different drawings may identify the same or similar elements.

As used herein, the term "context state" (also referred to simply as "state" or "context") may refer to information, data, and/or parameter values of the process that run on particular hardware, and of supporting software and hardware. A context completely or partially captures the state of the process. For example, if two different instances of the same application run on a machine A and a machine B, the application instances may exhibit an identical behavior. Examples of context states include contents of a Random Access Memory (RAM), of a program counter, of registers, of storage, etc. A client context or a client state, as used herein, may refer to a portion of the context, which defines the behavior of the application with respect to a particular client program that the application services. A client context does not refer to any part of context states of processes on a client device on which the client program is hosted (e.g., an end-user device). For example, if each of two different instances of a server program on a machine A and a machine B services a client program (simply "client"), the server instances may exhibit an identical behavior when they provide identical services to the client.

The systems and methods described herein relate to securely sharing context states between different MEC clusters. Cloud computing typically propagate computational resources, such as storage and Central Processing Unit (CPU) cycles, across multiple nodes in many ways. For example, schedulers can distribute CPU cycles across multiple nodes by providing instructions to run selected applications to different nodes. In another example, systems replicate centralized database applications whose input and output are driven through Application Programming Interface (API) calls. These systems apply database synchronization and file synchronization techniques to maintain data consistency across the nodes. Such approaches, however, may not be sufficient for sharing consistent application context states between MEC clusters or to transfer a context between two different instances of the application at different MEC clusters. The systems and methods described herein address and overcome some of the challenges that the above-referenced synchronization solutions face with respect to sharing or conveying context states between MEC clusters.

Figure 1A:
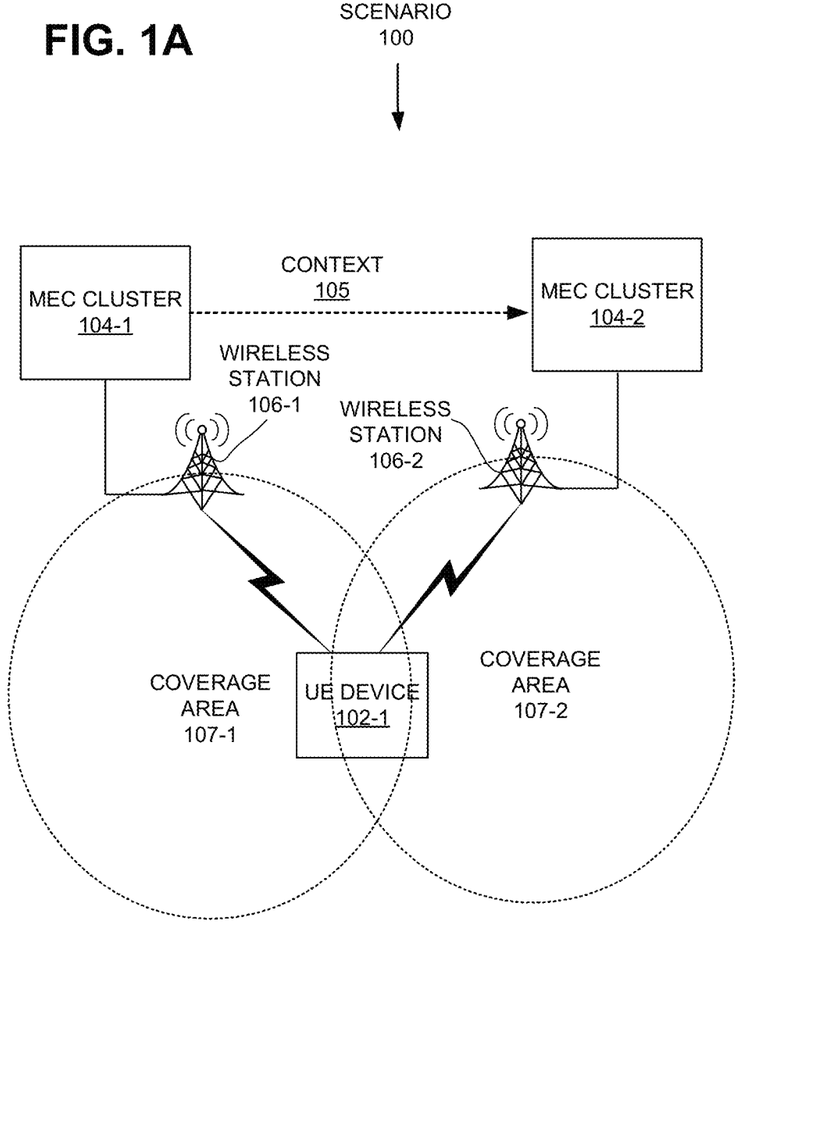
FIGS. 1A and 1B illustrate the concepts described herein.
Figure 1B:
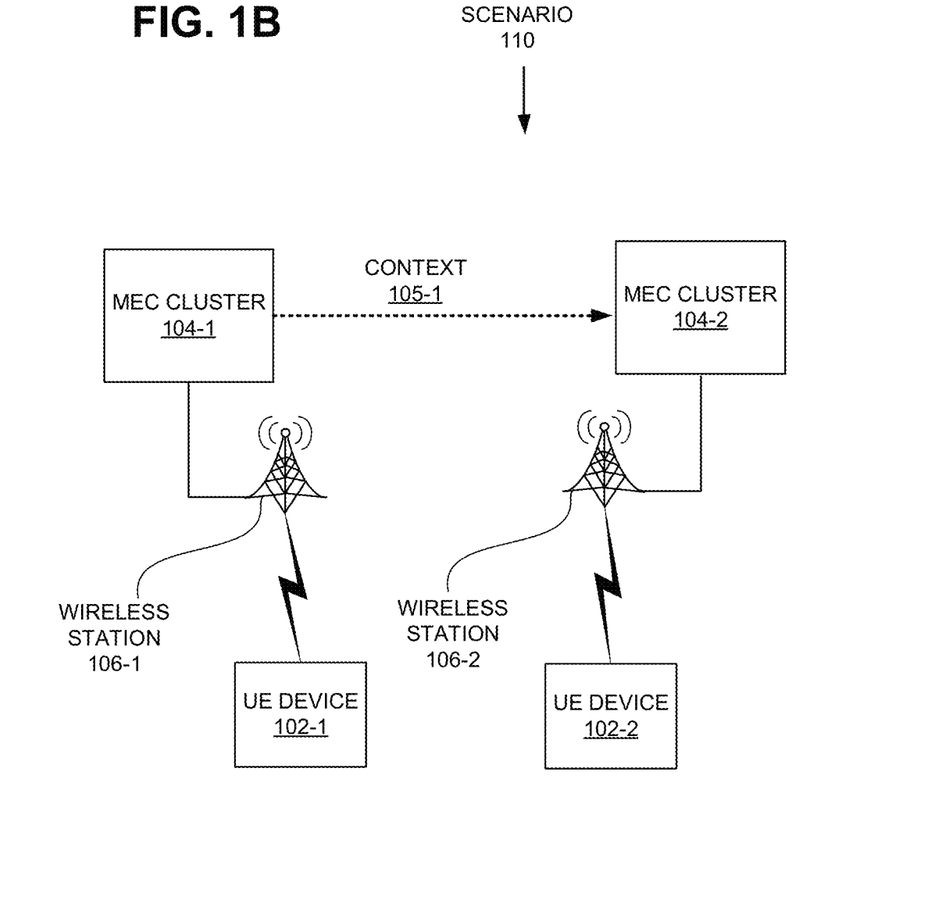

FIGS. 1A and 1B illustrate the concepts described herein. FIG. 1A shows an exemplary scenario 100, which involves User Equipment (UE) device 102-1, a MEC cluster 104-1 attached to a wireless station 106-1, and a MEC cluster 104-2 attached to a wireless station 106-2. These network components are described below in greater detail with reference to FIG. 2 through FIG. 7.

In FIG. 1A, assume that UE device 102-1 (e.g., a smart phone, an IoT device) is hosting a client application instance ("client") that is in communication with a server application instance ("server") hosted on MEC cluster 104-1. Also, assume that UE device 102-1 is moving out of a coverage area 107-1 of wireless station 106-1 and into a coverage area 107-2 of wireless station 106-2. Further assume that the client on UE device 102-1 is used to create and edit a text document through the server on MEC cluster 104-1; and that the document is stored at MEC cluster 104-1.

In FIG. 1A, if UE device 102-1 breaks its communication link with wireless station 106-1 and establishes a new link with station 106-2, UE device 102-1 will no longer have access to the file that the user was editing prior to the handoff, unless the client context for the server is transferred to MEC cluster 104-2. Accordingly, to provide some degree of continuity to the client on UE device 102-1 after the handoff, MEC cluster 104-1 conveys the context to MEC cluster 104-2. The server on MEC cluster 104-2 then uses the context to permit the client to edit the document. As a result of the context transfer, a copy of the document is now on MEC cluster 104-2 and the client may continue to edit the document after the handoff.

FIG. 1B shows another exemplary scenario 110, which involves two UE devices 102-1 and 102-2, MEC cluster 104-1 attached to wireless station 106-1, and MEC cluster 104-2 attached to wireless station 106-2. In FIG. 1B, assume that UE devices 102-1 and 102-2 include spreadsheet clients that are in communication with the servers on MEC cluster 104-1 and MEC cluster 104-2. Also, assume that the client on UE device 102-1 is focused on a tabbed view of a particular portion of the spreadsheet stored at MEC cluster 104-1. Also, assume that the user of UE device 102-1 wants the client on UE device 102-2 to focus on the same portion of the spreadsheet.

Hypothetically, it is possible for the user of UE device 102-1 to share the content with the user of UE device 102-2 by manually sending a copy of the document to the user of UE device 102-2, along with instructions to view the particular portion of the spreadsheet. This can be time consuming and inefficient, however.

To avoid the preceding, in FIG. 1B, the server on MEC cluster 104-1 has the ability to instruct MEC cluster 104-1 to transfer the context to MEC cluster 104-2. MEC cluster 104-1 provides security checks to ensure the integrity of the transfer. When MEC cluster 104-2 receives the context from MEC cluster 104-1, MEC cluster 104-2 provides the context to the local server. The server accepts the context and enables the client on UE device 102-2 to access the corresponding document portion (a portion on the copy now resident on MEC cluster 104-2) on which the client on UE device 102-1 is focused.

In FIG. 1A, MEC cluster 104-1 initiates the transfer of the context. In contrast, in FIG. 1B, the server on MEC cluster 104-1 initiates the transfer. Despite the difference, however, in both FIGS. 1A and 1B, MEC clusters 104-1 and 104-2 use the same system to convey the context. To transfer a context from one MEC cluster 104-1 to another MEC cluster 104-2, the system encapsulates the client context of the server on MEC cluster 104-1 as what is referred to below as a context state transfer package (CSTP) and forwards the CSTP to MEC cluster 104-2. The server on MEC cluster 104-2 shares the context when MEC cluster 104-2 receives and unpacks the CSTP. As explained below, the system provides security and speed, and therefore can enhance end-user experience.

Figure 2:
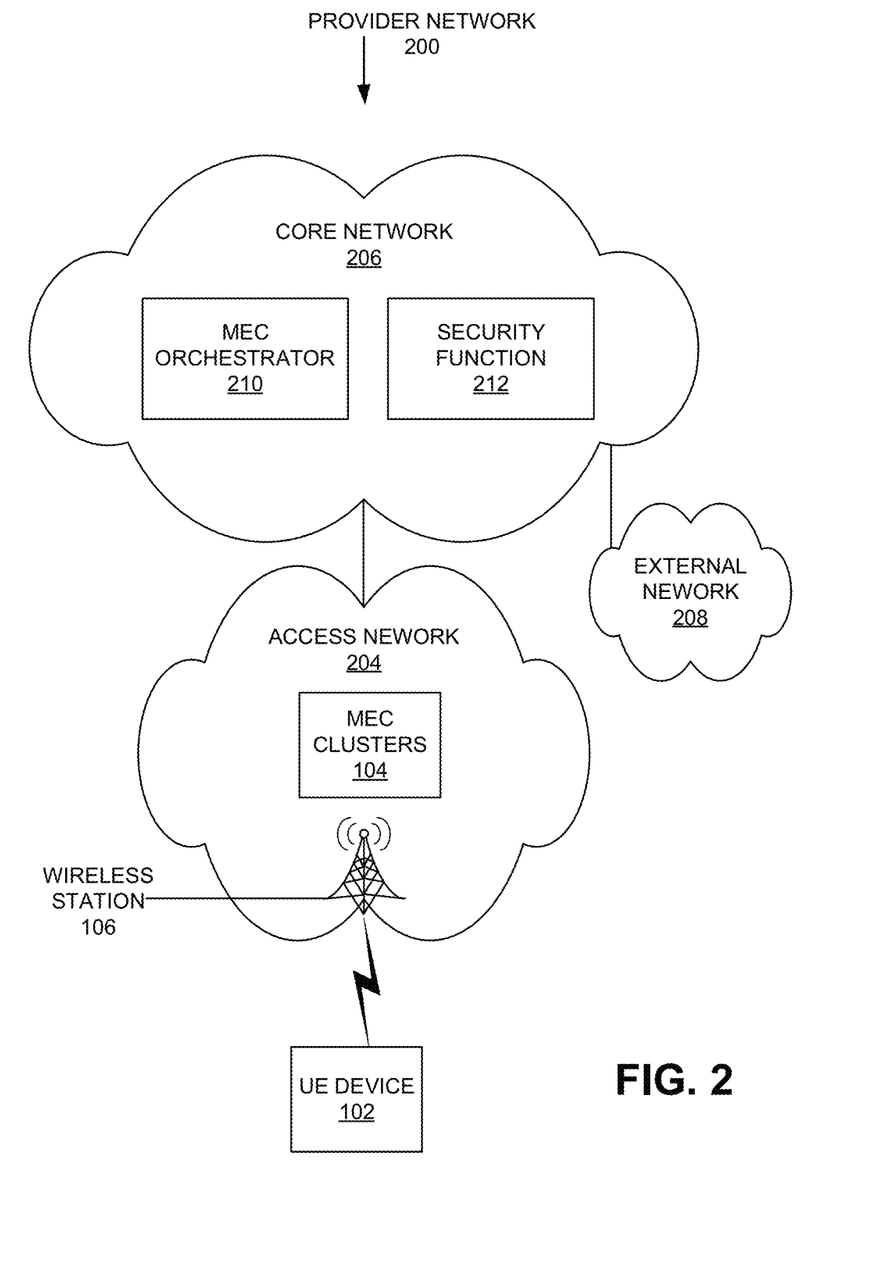
FIG. 2 illustrates an exemplary network environment in which the concepts described herein may be implemented.

FIG. 2 illustrates an exemplary network environment in which the concepts described herein may be implemented. As shown, the environment includes UE devices 102 (collectively referred to as "UE devices 102" or generically as "UE device 102") and a provider network 200, which in turn includes an access network 204 and a core network 206. Provider network 200 may include or be connected to an external network 208.

For simplicity, FIG. 2 does not show all components that may be included in provider network 200 (e.g., routers, bridges, wireless access point, additional networks, additional UE devices, etc.). That is, depending on the implementation, the network environment and provider network 200 may include additional, fewer, different, or a different arrangement of components than those illustrated in FIG. 2.

UE device 102 may include a wireless communication device. Examples of a UE device 102 include: a smart phone; a tablet device; a wearable computer device (e.g., a smart watch); a global positioning system (GPS) device; a laptop computer; a media playing device; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 204.

UE device 102 may host a client that communicates with a server in provider network 200. Although a server can be hosted at different network components, in implementations described herein, the servers are assumed to be hosted on MEC clusters 104. As indicated above, a client on UE device 102 can trigger a MEC cluster 104-1 to transfer the context to another MEC cluster 104-2.

Access network 204 may allow UE device 102 to access core network 206. To do so, access network 204 may establish and maintain, with participation from UE device 102, an over-the-air channel with UE device 102; and maintain backhaul channels with core network 206. Access network 204 may convey information through these channels, from UE device 102 to core network 206 and vice versa.

Access network 204 may include a Long-term Evolution (LTE) radio network and/or a 5G radio network or other advanced radio network. These radio networks may include many wireless stations, which are illustrated in FIG. 2 as wireless stations 106, for establishing and maintaining an over-the-air channel with UE device 102.

Wireless station 106 may include a Fourth Generation (4G), 5G, or another type of wireless station (e.g., eNB, gNB, etc.) that includes one or more radio frequency (RF) transceivers. Wireless station 106 (also referred to as base station 106) may provide or support one or more of the following: carrier aggregation functions; advanced or massive multiple-input and multiple-output (MIMO) antenna functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 106 may be part of an evolved UMTS Terrestrial Network (eUTRAN).

As shown in FIG. 2, access network 204 may also include MEC clusters 104. In some implementations, MEC clusters 104 may be coupled to wireless stations 106. Such MEC clusters 104 may be geographically close to UE devices 102 that are attached to access network 204 via wireless station 106, and thus may be capable of providing services to UE devices 102 with minimal latency. MEC cluster 104, in combination with other network components, may transfer contexts to another MEC cluster 104 and thus allow the client on UE device 102 to operate without disruption.

Transferring context involves at least two MEC clusters 104, such as MEC cluster 104-1 and MEC cluster 104-2. The transfer process may begin when cluster 104-1 receives, from a network component, a notification that a context needs to be transferred to another cluster. Thereafter, cluster 104-1 performs security checks, encapsulates a context in a context state transfer package (CSTP), and forwards the CSTP to MEC cluster 104-2. A server on MEC cluster 104-2 may share the context after MEC cluster 104-2 receives the CSTP, unpacks the CSTP, and hands off an appropriate portion of the CSTP to the server.

Core network 206 may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of Internet Protocol (IP) services to UE device 102, and may interface with other networks, such as external network 208.

Depending on the implementation, core network 206 may include different types of core components, such as 4G or 5G core components. Examples of 4G core components include: Home Subscriber Server (HSS), an Authentication Authorization and Accounting (AAA) server, and a Packet data network Gateway (PGW). Examples of 5G core components include a User Plane Function (UPF), a Network Repository Function (NRF), a Network Exposure Function (NEF), a Unified Data Management (UDM), an Authentication Server Function (AUSF), a Security Edge Protection Proxy (SEPP), a Charging Function (CF), a Policy and Charging Rules Function (PCRF).

Core network 206 may include a MEC orchestrator 210 (also referred to simply as orchestrator 210) for coordinating MEC clusters 104. Orchestrator 210 distributes application instances ("applications"), which include servers, on MEC clusters 104 based on a set of criteria; and collects, maintains and shares information to facilitate communications between the applications. For example, orchestrator 210 may create or delete applications at MEC clusters 104 based on physical locations of the clusters 104, latencies associated with the clusters 104, and load balancing requirements.

MEC orchestrator 210 supports optimum application services to clients on UE devices 102 and supports context transfers between applications on MEC clusters 104, by using its own routing mechanism. MEC orchestrator 210 uses a routing table to forward the client-originated messages arriving at MEC orchestrator 210 to one of the applications on MEC clusters 104. Conversely, MEC orchestrator 210 hands off any messages from an application on MEC cluster 104, performing any routing related tasks necessary to ensure proper transport of the messages to the clients on UE devices 102. This way, UE devices 102 may receive services from what appears to be a generic application (to the UE devices 102) with core network-wide presence in provider network 200.

To enable routing, when MEC cluster 104-1 registers applications (which are instantiated at MEC cluster 104-1) at orchestrator 210, orchestrator 210 obtains the network addresses of the applications as part of registration data (e.g., Universal Resource Identifiers). MEC orchestrator 210 may store the registration data in a database.

Additionally, MEC orchestrator 210 shares the collected registration data with MEC clusters 104, which may use the shared data to forward contexts to other MEC clusters 104. Although MEC orchestrator 210 is shown in FIG. 2 as being included in core network 206, in other implementations, orchestrator 210 may be hosted at other network components, such as access network 204, external network 208, MEC clusters 104, etc.

As further shown, core network 206 may include security functions 212. Security functions 212 may validate that the application on MEC cluster 104-1 or MEC cluster 104-1 itself is authorized to send a context from MEC cluster 104-1 to another application on MEC cluster 104-2 or to MEC cluster 104-2 itself. Examples of security functions 212 may include: a function for inserting a hash of a context into a permissions ledger of a blockchain. Depending on the implementation, the blockchain may be public or private and based on proof-of-stake, proof-of-work, etc. When the block containing the hash is deemed valid, MEC cluster 104-1 may determine that the to-be performed context transfer is permissible.

External network 208 includes networks that are external to core network 206. In some implementations, external network 208 may include packet data networks, such as an Internet Protocol (IP) network. An IP network may include, for example, an IP Multimedia Subsystem (IMS) network that provides a Short Messaging Service (SMS), Voice-over-IP (VoIP) service, etc. Depending on the implementation, some of these components may participate in context transfer processes.

Figure 3:
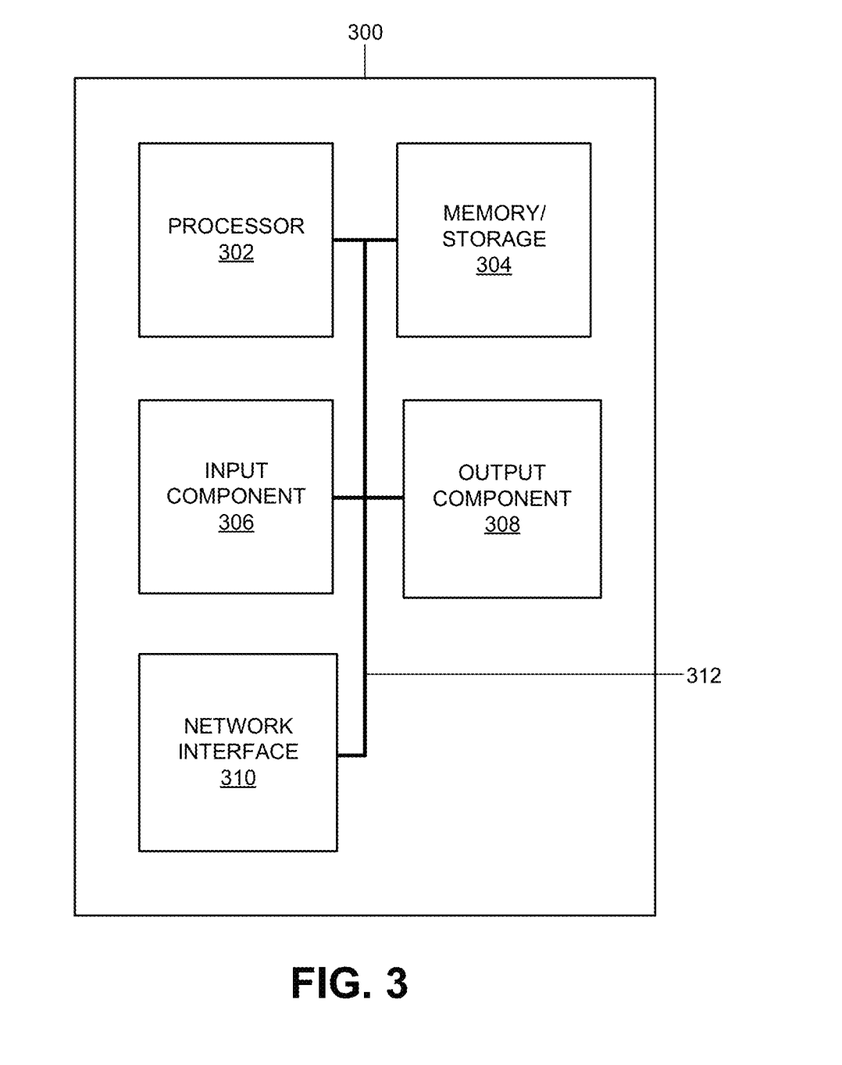
FIG. 3 depicts exemplary components of an exemplary network device.

FIG. 3 depicts exemplary components of an exemplary network device 300. Network device 300 corresponds to or is included in any of the network components of FIGS. 1A, 1B, and 2 (e.g., UE device 102, a router, a network switch, servers, gateways, devices in MEC clusters 104, etc.). As shown, network device 300 includes a processor 302, memory/storage 304, input component 306, output component 308, network interface 310, and communication path 312. In different implementations, network device 300 may include additional, fewer, different, or a different arrangement of components than the ones illustrated in FIG. 3. For example, network device 300 may include a display, network card, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc.

Network interface 310 may include an Ethernet interface to a LAN, and/or an interface/connection for connecting device 300 to other devices (e.g., a Bluetooth interface). For example, network interface 310 may include a wireless modem for modulation and demodulation.

Communication path 312 may enable components of network device 300 to communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory or storage (e.g., memory/storage 304, when executed by processor 302, may cause processor 302 to perform processes that are described herein. For example, instructions stored in memory/storage of MEC clusters 104 may be executed by processor 302 of MEC cluster 304, and securely transfer context states.

Figure 4:
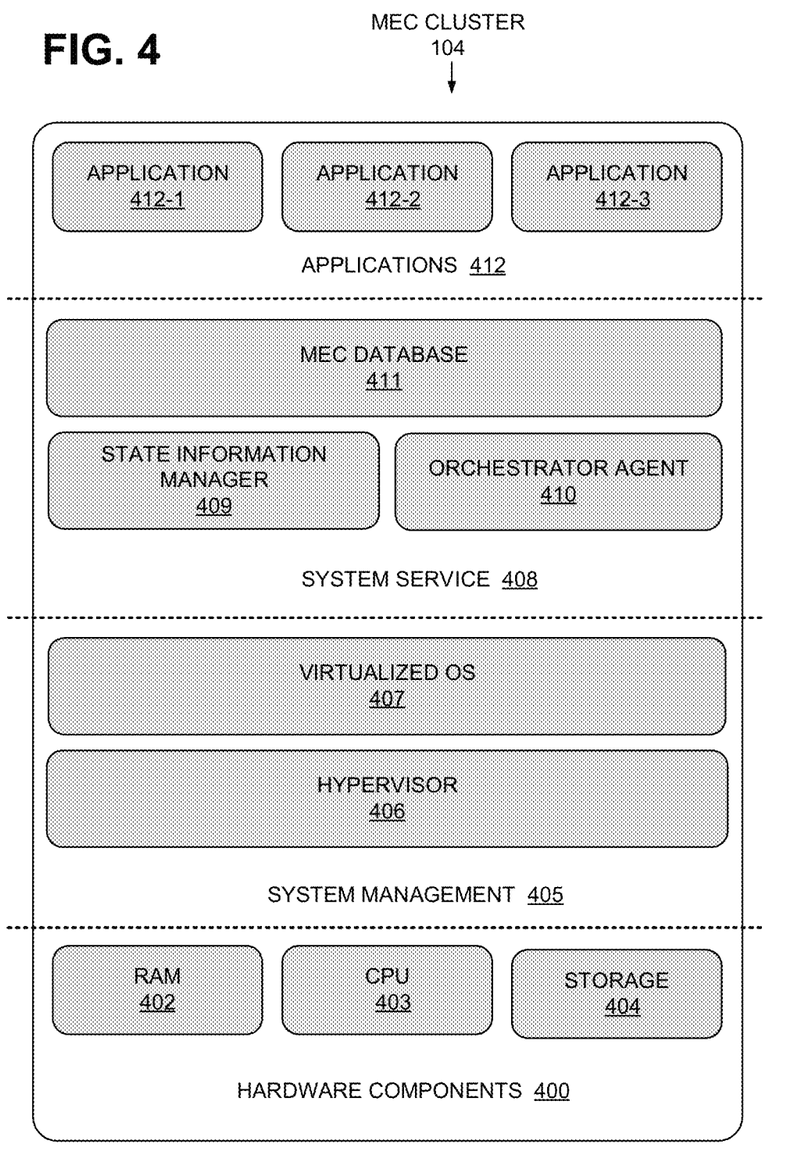
FIG. 4 depicts exemplary functional components of the Multi-access Edge Computing (MEC) cluster of FIG. 4.

FIG. 4 shows exemplary functional components of a MEC cluster 104. MEC cluster 104 may be implemented using network devices 300, the components of network device 300, and software components. As shown, MEC cluster 104 may include hardware components 400, system management components 405, system service components 408, and applications 412. Components 405, 408, and 412 are implemented as software in storage 304; and include corresponding instances in memory 304.

Hardware components 400 may include RAMs 402, CPUs 403, and storage 404, which have been described above with reference to FIG. 3. System management components 405 may include a hypervisor 406 and a virtualized operating system (OS) 407. Hypervisor 406 oversees creation and maintenance of virtual machines. Virtualized OS 407 manages computational resources for system service components 408 and applications 412. Together, hypervisor 406 and virtualized OS 407 may capture states of hardware components 400, portions of the virtual machine states, and portions of virtualized OS states. Hypervisor 406 and virtualized OS 407 may capture these states as discrete "state units," and provide the captured state units to state information manager 409. As well, hypervisor 406 and virtualized OS 407 may accept state units from state information manager 409, and place the virtual machine and the OS, and the hardware components in the appropriate states based on the received state units.

System service components 408 include state information manager 409, orchestrator agent 410, and MEC database 411. State information manager 409 may: perform security checks for a planned context transfer; obtain a context associated with an application on the MEC cluster 104-1 from other components in discrete state units; package the state units in a context state transfer package (CSTP); and forward the CSTP to other MEC clusters 104. State information manager 409 may also receive a CSTP from another MEC cluster 104, unpack the CSTP to extract state units, and provide the extracted state units to applications 412, hypervisor 406 and virtualized OS 407. As used herein, a CSTP may be a compressed file, and may or may not include metadata, depending on the implementation.

Orchestrator agent 410 shares local MEC cluster-related information with MEC orchestrator 210. To share the information, orchestrator agent 410 may register each application running on local MEC cluster 104 at MEC orchestrator 210. During the registration, agent 410 may provide application instance ID, the local MEC cluster ID, and/or description of interfaces that may be used for callbacks, etc.

In addition, orchestrator agent 410 obtains other MEC cluster-related data from MEC orchestrator 210. State information manager 409 may use the data, for example, to construct and transfer a CSTP to another MEC cluster 104-2. In providing data to or obtaining data from MEC orchestrator 210, orchestrator agent 410 maintains the local MEC cluster 104 in sync with MEC orchestrator 210.

Orchestrator agent 410 also executes instructions from MEC orchestrator 210. For example, agent 410 may instantiate applications on behalf of MEC orchestrator 210, in the local MEC cluster 104 and/or terminate locally running applications in response to instructions from MEC orchestrator 210. In another example, agent 410 may modify process priorities. In yet another example, agent 410 may collect performance metrics (e.g., RAM or CPU utilization) and provide the data to MEC orchestrator 210, which may use the data to decide which applications to run on each of MEC clusters 104.

MEC database 411 includes a local copy of the registration data collected at MEC orchestrator 210 and other information. State information manager 408 may use the data in database 411 to construct CSTPs and forward the CSTPs to other MEC clusters 104. MEC database 411 is described below in greater detail with reference to FIG. 5.

Applications 412 include copies of applications. When an application 412 is created at MEC cluster 210, agent 410 registers the application 412 at MEC orchestrator 210. Conversely, when the application 412 terminates, agent 410 de-registers the application 412 from orchestrator 210. Depending on the implementation, applications 412 may share, via state information manager 409, a context with other applications 412 on other MEC clusters 104.

The components illustrated in FIG. 4 are exemplary. Depending on the implementation, MEC cluster 104 may include additional, fewer, different, or a different arrangement of components than those illustrated in FIG. 4. For example, in one implementation, MEC cluster 104 may include virtual hardware components, such as virtual processors, physical and/or virtual network interfaces/ports, virtual/physical device drivers, etc. In another example, hardware components 400 may include physical or logical network interfaces, input components 306, output components 308, etc.

Figure 5:
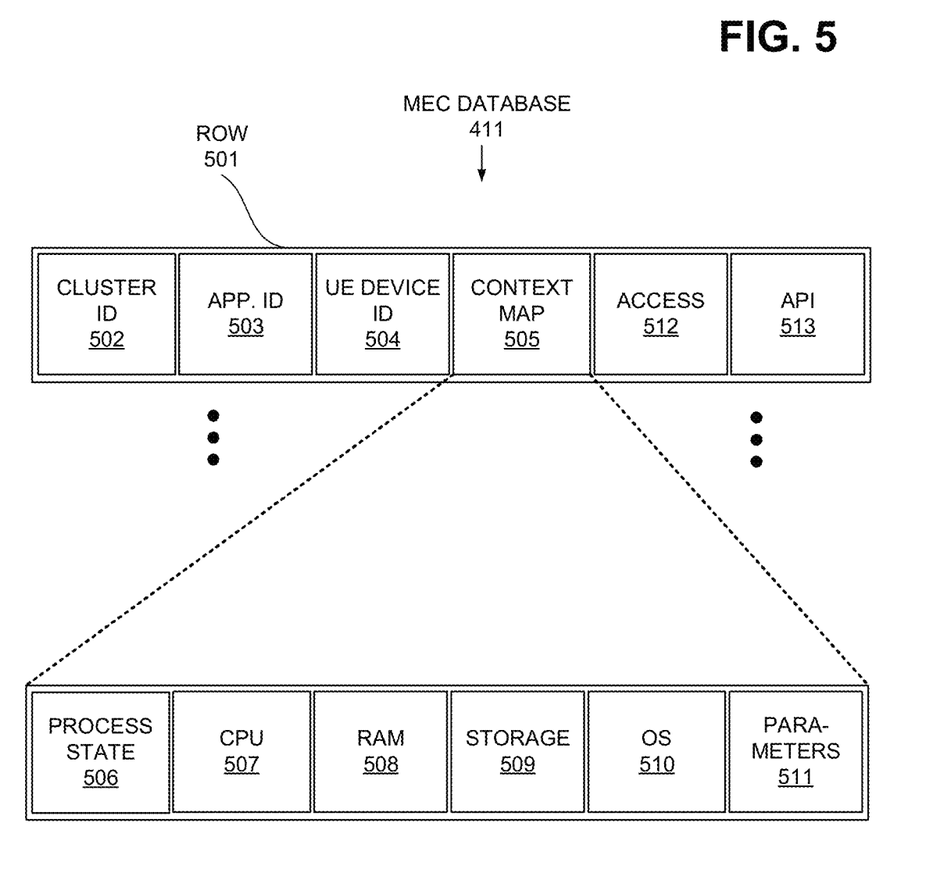
FIG. 5 illustrates an exemplary MEC database in the MEC cluster of FIG. 4 according to one implementation.

FIG. 5 illustrates exemplary components of MEC database 411. As shown, MEC database 411 may include one or more rows, one of which is illustrated as row 501 (also referred to herein as record 501). Each record in MEC database 411 may include multiple data. Examples of such data are shown in FIG. 5 as a cluster identifier (ID) 502, an application ID 503, a UE device ID 504, a context map 505, an access 512, and APIs 513.

Cluster ID 502 may include alphanumeric string that uniquely identifies the MEC cluster 104 at which the application specified by datum 503 executes. In some implementations, cluster ID 502 may be assigned by MEC orchestrator 210 when an application hosted by the MEC cluster 104 is registered at MEC orchestrator 210. Any identifier may be used, provided that the identifier uniquely identifies the MEC cluster 104 within provider network 200.

Application ID 503 includes an alphanumeric string that identifies an application instance within the MEC cluster 104. UE device ID 504 may include a unique identifier for the UE device 102 that is serviced by the application. Examples of UE device ID 504 include a Mobile Station International Subscriber Directory Number (MSISDN), an International Mobile Subscriber Identity (IMSI), an external ID, and an IP address. Context map 505 specifies what discrete units of state information needs to be captured by state information manager 409 to obtain a snapshot of the context associated with a process/thread serving the client running on UE device 102.

As further shown, context map 505 specifies state units, such as process state 506, CPU state 507, RAM state 508, storage state 509, OS state 510, and parameters state 511. Process state 506 may identify stacks, variables, locks, and/or other parameters of the process. CPU state 507 may identify CPU registers and/or parameters that characterize part of the CPU state associated with the application. RAM state 508 identifies RAM locations (e.g., in a virtual memory space) that needs to be saved to capture the RAM context. Storage state 509 may designate files and/or other persistent storage locations. OS state 510 may specify OS parameters, such as communication buffers, driver states, etc., that are associated with the application. Parameters state 511 may specify application specific parameters (e.g., variable values).

Access data 512 specifies the security checks that need to be performed before MEC cluster 104 transfers a context that is captured by state information manager 409. The security checks specified by access data 512 may depend on various factors, such as the location of MEC cluster 104, whether MEC cluster 104 to which the context is to be sent is external to provider network 200, the application type (e.g., a credit card processing application type), etc.

API data 513 may identify the APIs and their argument types (e.g., integer, string, floating point, etc.) for conveying the context. For some applications, API data 513 may not specify any APIs or argument types. For example, assume that a client is running on UE device 102 is serviced by an application that is dedicated solely to the client. When MEC cluster 104-1 captures and transfers the context to MEC cluster 104-2, MEC cluster 104-2 may instantiate the entire application using the captured context from MEC cluster 104-1, without having to transfer any state units to the instantiated application via APIs. No API needs to be specified to transfer contexts for such applications.

In contrast to the preceding example, if an application at the MEC cluster 104-2 is configured to service multiple clients, to transfer the context associated with a single client from MEC cluster 104-1, it may not be possible to re-instantiate the application at MEC cluster 104-2 just for the client, without disrupting the services provided to the multiple clients. For these types of applications, selected state units of the context can be transferred through the APIs identified by API data 513.

Depending on the implementation, each record 501 in MEC database 411 may include additional, fewer, or different data than those illustrated in FIG. 5. For example, in one implementation, record 501 may include data that identifies a geographical location of MEC cluster 104, utilization of hardware components, latency, etc.

Figure 6A:
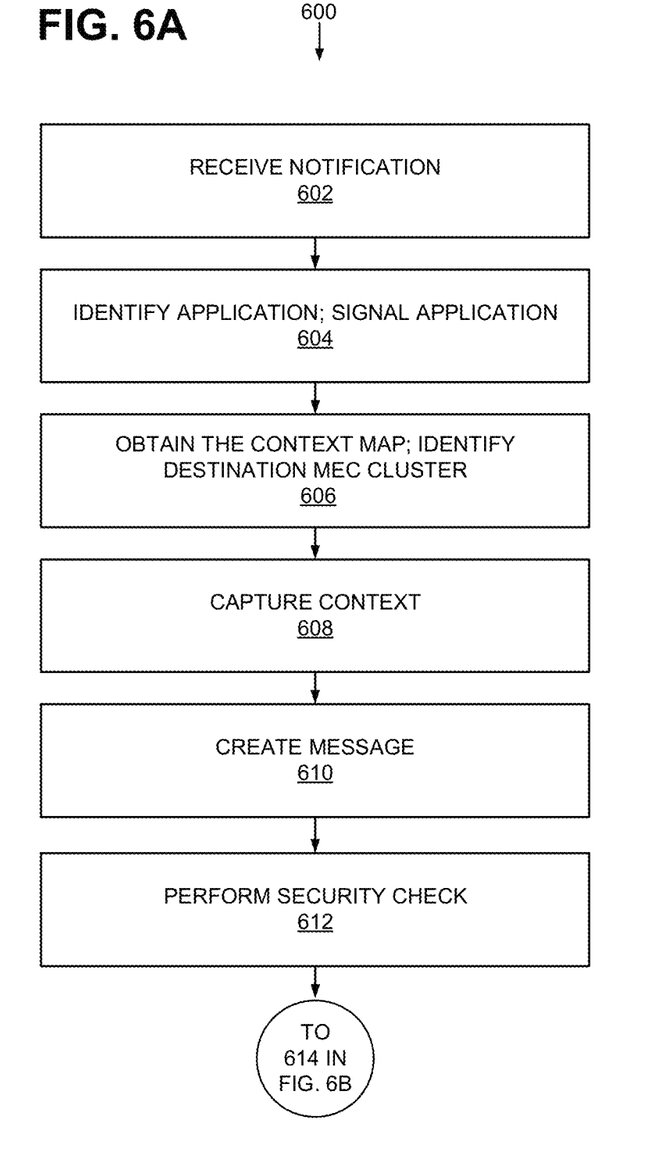
FIGS. 6A and 6B show a flow diagram of an exemplary process for securely sharing an application context between the MEC clusters according to one implementation.
Figure 6B:
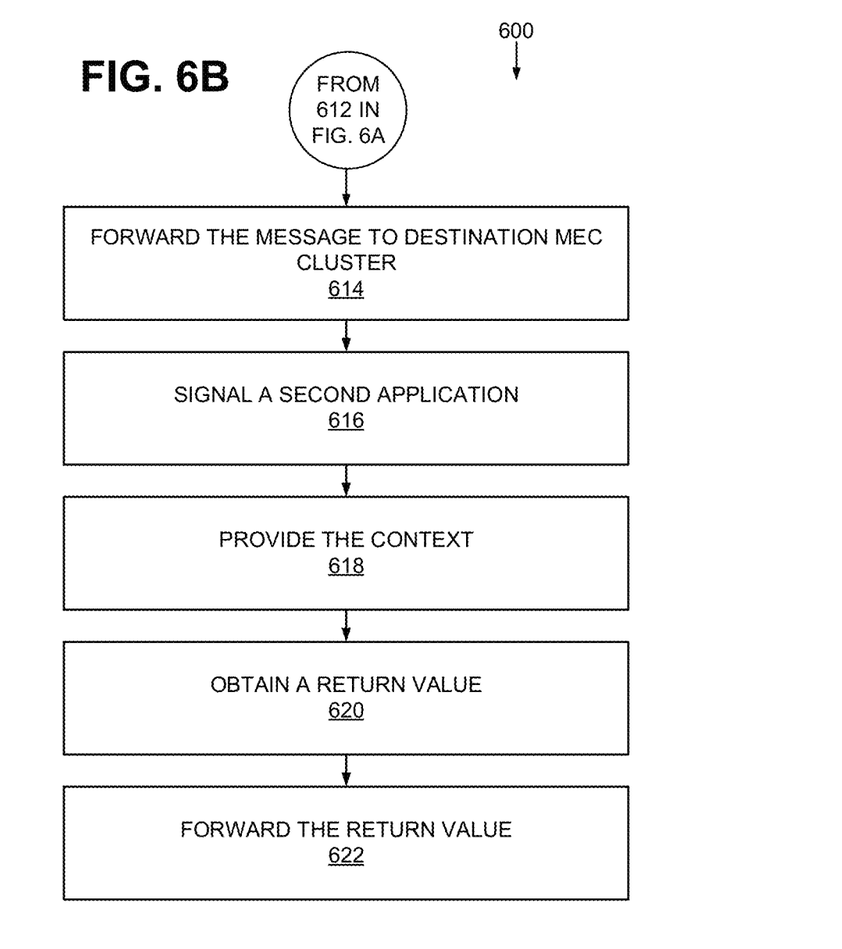

FIGS. 6A and 6B show a flow diagram of an exemplary process 600 for securely sharing an application context between MEC clusters 104. Different portions of process 600 may be performed by UE devices 102, MEC clusters 104, MEC orchestrator 210, and/or other network components in provider network 200.

As shown, process 600 may include MEC cluster 104 or its component (e.g., State Information Manager 409) receiving a notification (block 602). The notification indicates that a context needs to be transferred. In some cases, a core network component may have generated the notification in response to detecting an event that requires a context associated with servicing a client to be transferred from MEC cluster 104-1 to MEC cluster 104-2. The detected event may include, for example, a movement of the client (hosted by UE device 102-1) from one wireless station 106 to another. In another example, the notification may have been generated by the application servicing the client, based on its interaction with the client on UE device 102-1. For example, the client may indicate to application 412 that it wishes to send a message to another client, and application 412 may send the notification to MEC cluster 104-1.

In response to receipt of the notification, MEC cluster 104-1 may use the information in the notification to identify the application servicing the client (block 604). For example, MEC cluster 104-1 may use the UE device ID provided in the notification to look up, in MEC database 411, a corresponding record 501 to identify the particular application. MEC cluster 104-1 may use the identified/retrieved record 501 to obtain the ID of the application. Further, using an API associated with the application, MEC cluster 104-1 may signal the application that the context for the client will be transferred to another application on MEC cluster 104-2 (block 604). In response, the application may perform any cleanup operations, such as deleting files, terminating certain processes (e.g., ending further receipt of data input at the client), etc.

In a different example, if the notification was sent from the application 412 to MEC cluster 104-1, the notification may already include its application ID. MEC cluster 104-1 may use the application ID to look up, in the database 411, the record 501 without notifying the application.

Process 600 may further include obtaining, from the record 501, context map 505 (block 606) and identifying a destination MEC cluster 104-2, to which MEC cluster 104-1 will forward the context. In one situation, MEC cluster 104-2 may be identified based on, for example, the geographical location of the UE device 102-1, the location of MEC cluster 104-2, resources available at MEC cluster 104-2, etc. Once the MEC cluster 104-2 is identified, MEC cluster 104-1 may determine a network address of the application 412 hosted on MEC cluster 104-2.

In another situation, if the notification already includes the ID of the application hosted on MEC cluster 104-2, MEC cluster 104-1 may look up MEC database 411 to obtain any information that is needed to forward the context (e.g., the network address or the ID of MEC cluster 104-2) to MEC cluster 104-2.

Process 600 may include MEC cluster 104-1 capturing the context of the application on MEC cluster 104-1 using the context map 505 in the record 501 (block 608). As described above, context map 505 specifies state units, or units of state information needed to be collected to assemble a full context. MEC cluster 104-1 may request system management components 405 to collect process state 506, CPU state 507, RAM state 508 and provide the collected state units to state information manager 409. When the state information manager 409 receives the state units, state information manager 409 may compress the units into a CSTP (block 610).

In creating the CSTP, MEC cluster 104-1 may digitally sign the context with a private key of MEC cluster 104-1 or of the application on MEC cluster 104-1. That is, the CSTP can include a digital signature. The signature may provide a level of security (i.e., ensure that the CSTP is not sent from an unauthorized source), In some implementations, MEC cluster 104-1 may not generate a digitally signed CSTP, when provider network 200 in which MEC clusters 104 and MEC orchestrator 210 include sufficient built-in security features.

Process 600 may further include performing security checks (block 612), to ensure that the context transfer is valid. In one implementation, security function 212 may validate that the application on MEC cluster 104-1 or MEC cluster 104-1 itself may send a context to another application on MEC cluster 104-2 or to MEC cluster 104-2 itself. For example, security function 212 may make a permissions ledger entry for the context at a blockchain. When the block containing the entry is deemed valid, MEC cluster 104-1 may determine that the to-be completed context transfer is authorized.

As shown in FIG. 6B, process 600 may further include MEC cluster 104-1 creating a message that includes the CSTP (block 614). The message may include the address of the application 412, on MEC cluster 104-2, which is to receive the context and the address of the MEC cluster 104-2. Thereafter, MEC cluster 104-1 may forward the message to MEC cluster 104-2 (block 614). In one implementation, MEC orchestrator 210 may route the message from MEC cluster 104-1 to MEC cluster 104-2.

Process 600 may include signaling the application 412 on MEC cluster 104-2 (block 616). When MEC cluster 104-2 receives the message from the MEC orchestrator 210, MEC cluster 104-2 may first verify the payload (i.e., CSTP) of the message. For example, if a private key of the client, of the application, or of the MEC cluster 104-1 was used to sign the CSTP at MEC cluster 104-1, MEC cluster 104-2 may use a corresponding public key of the client, of the application, or of the MEC cluster 104-1 to verify the CSTP sent from MEC cluster 104-1.

After the verification, MEC cluster 104-2 may use the API, associated with the application on MEC cluster 104-2, to signal the application 412. In some implementations, the application 412 on MEC cluster 104-2 may respond to the notification, by indicating what state units in the unpacked CSTP (i.e., the portions of the full context) should be used to place the RAM, CPU, the virtual OS, and/or the storage of MEC cluster 104-2 in the proper state. In addition, the application 412 on MEC cluster 104-2 may prepare for the context transfer.

Process 600 may further include providing the context or state units (block 618). In one implementation, MEC cluster 104-2 may provide the state units to MEC cluster 104-2, by passing the contents of the state units in the CSTP to its RAM, CPU, storage system, etc. (i.e., its hardware components) via state management components 406. In addition, MEC cluster 104-2 may pass other state units, such as state parameters, to the application on MEC cluster 104-2 via its API.

After conveying the context, MEC cluster 104-2 may obtain a return value from the application 412 on MEC cluster 104-2 (block 620). Whether the application 412 on MEC cluster 104-2 does provide the return value is implementation dependent. If MEC cluster 104-2 is able to obtain the return value, MEC cluster 104-2 may then forward the return value to the application 412 at MEC cluster 104-1 (block 622) (e.g., to indicate whether the context transfer was successfully performed).

Figure 7:
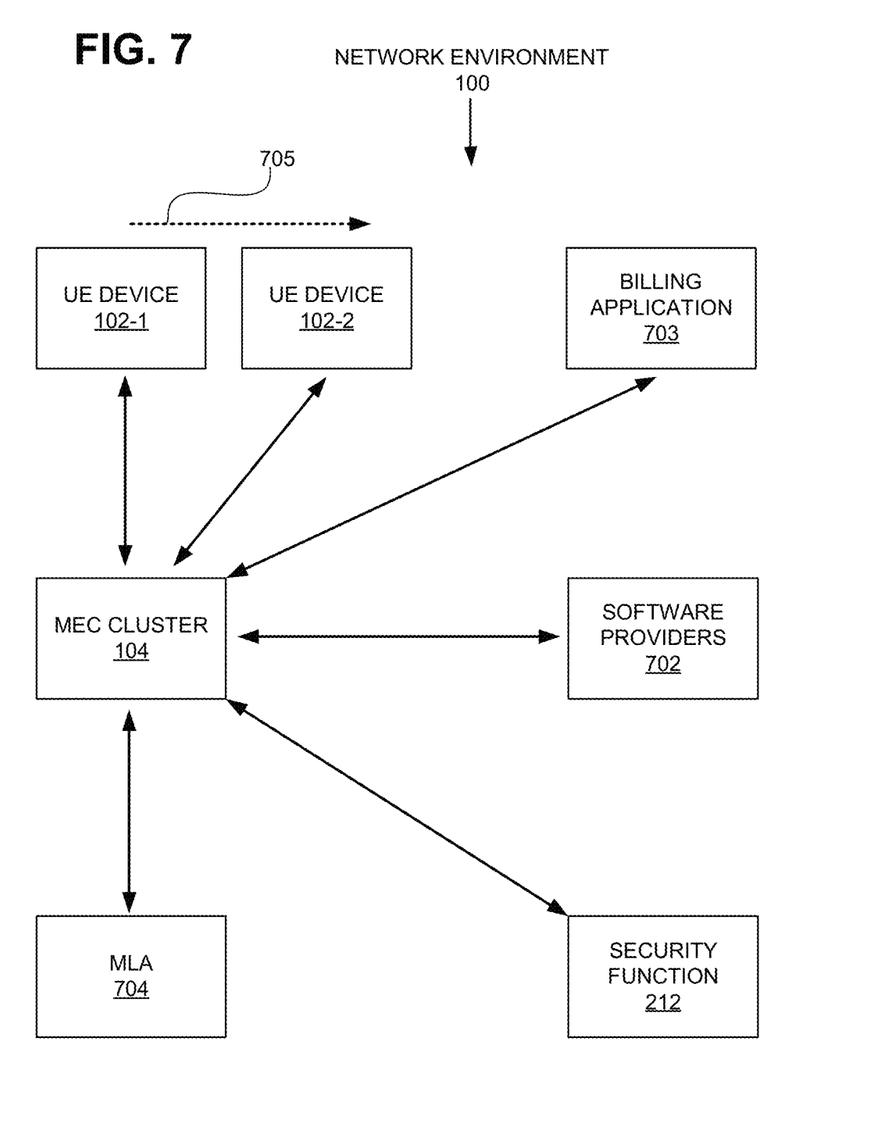
FIG. 7 illustrates exemplary support that different network components may provide to facilitate context transfer between the MEC clusters, according to one implementation.

FIG. 7 illustrates exemplary support that different network components may provide to facilitate context transfer between MEC clusters 104, according to one implementation. As shown, software providers 702, security function 212, billing application 703, and Machine Learning Application (MLA) 704 may provide support for the context transfer. Assume that, in FIG. 7, a client on UE device 102-1 requests MEC cluster 104-1 to convey a context (e.g., a portion of a file, embed a video inside a video, etc.) to MEC cluster 104-2. Without the transfer, the users of the UE devices 102-1 and 102-2 would be required to perform multiple manual operations (e.g., manually exchange files, navigating to specific portions, etc.).

Software providers 702 provide security credentials, such as security certificates, and perform requested services. Software providers 702 send the results of performing the services to MEC clusters 104 or MEC orchestrator 210 (not shown in FIG. 7). If there is a charge by software providers 702, the charges are forwarded to an entity, in provider network 200, which processes the charges.

Security function 212 may determine whether a MEC cluster 104 should be allowed to communicate with another MEC cluster 104 based on particular security protocols specified or defined by the service provider (i.e., provider network 200 operator). In some implementations, security function 212 may also determine whether software providers 702 may perform services.

Billing application 703 may charge each account that is associated with users of UE devices 102 for rendered services. Depending on the policy, one account of UE device 102-1 may be charged (e.g., as an initiator of the communication) or the charge may be split between the users of UE devices 102-1 and 102-2. Regardless of how the charges are split, the charges may be settled at the MEC level via billing application 703.

MLA 704 may learn from successful context transfer executions/charges and perform operations based on what MLA 704 learned from the successful executions. The information associated with the successful execution may be stored in a database.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 6A and 6B, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A first network device comprising a first virtualized operating system (OS) and a hardware processor configured to:
   receive a notification over a network;
   identify, based on the notification, a first application executing on the first virtualized OS;
   identify, based on the notification, a second network device and a second application executing on a second virtualized OS, wherein the second network device comprises the second virtualized OS;
   cause the first virtualized OS and a hypervisor to obtain state information of the first application;
   create a context state transfer package (CSTP) based on the state information;
   perform a security check to determine if the first network device is permitted to transmit the CSTP to the second network device over the network;
   forward, over the network, the CSTP to the second network device, wherein the second network device is configured to:
   receive, over the network, the CSTP from the first network device;
   unpack the state information from the received CSTP; and
   use the unpacked state information to put the second application executing on the second virtualized OS in a same state as the first application when the state information was obtained at the first network device.

2. The first network device of claim 1, wherein the first network device and the second network device are included in a first Multi-access Edge Computing (MEC) cluster and a second MEC cluster, respectively.

3. The first network device of claim 2, wherein the notification indicates that a User Equipment device serviced by the first application is moving from a first coverage area associated with a first wireless station coupled to the first MEC cluster and into a second coverage area associated with a second wireless station coupled to the second MEC cluster.

4. The first network device of claim 1, wherein when the processor causes the first virtualized OS and the hypervisor to obtain the state information, the first virtualized OS and the hypervisor are configured to obtain one or more of:
   Random Access Memory (RAM) state information, Central Processing Unit (CPU) state information, or file storage state information.

5. The first network device of claim 1, wherein when the processor creates the CSTP, the processor is configured to:
   generate a compressed file that includes the state information.

6. The first network device of claim 5, wherein when the processor creates the CSTP, the processor is further configured to add a digital signature to the compressed file, wherein when the processor adds the digital signature, the processor uses a private key associated with the first network device.

7. The first network device of claim 1, wherein when the processor performs the security check, the processor is further configured to:
   insert a hash of the state information to a permissions ledger of a blockchain.

8. The first network device of claim 1, wherein the CSTP includes metadata.

9. The first network device of claim 1, wherein the notification indicates that the first application has detected an event in which a client hosted by a User Equipment device serviced by the first application has requested the first application to transfer state information, associated with the client, from the first network device to the second network device.

10. A method comprising:
    receiving, over a network, a notification at a first network device comprising a first virtualized operating system (OS);
    identifying, based on the notification, a first application executing on the first virtualized OS;
    identifying, based on the notification, a second network device and a second application executing on a second virtualized OS, wherein the second network device comprises the second virtualized OS;
    causing the first virtualized OS and a hypervisor to obtain state information of the first application;
    creating a context state transfer package (CSTP) based on the state information;
    performing a security check to determine if the first network device is permitted to transmit the CSTP to the second network device over the network;
    forwarding, over the network, the CSTP from the first network device to the second network device;
    receiving, over the network, at the second network device, the CSTP from the first network device;
    unpacking, at the second network device, the state information from the received CSTP; and
    using the unpacked state information to put the second application executing on the second virtualized OS in a same state as the first application when the state information was obtained at the first network device.

11. The method of claim 10, wherein the first network device and the second network device are included in a first Multi-access Edge Computing (MEC) cluster and a second MEC cluster, respectively.

12. The method of claim 11, wherein the notification indicates that a User Equipment device serviced by the first application is moving from a first coverage area associated with a first wireless station coupled to the first MEC cluster and into a second coverage area associated with a second wireless station coupled to the second MEC cluster.

13. The method of claim 10, wherein causing the first virtualized OS and the hypervisor to obtain the state information includes obtaining one or more of:
    Random Access Memory (RAM) state information, Central Processing Unit (CPU) state information, or file storage state information.

14. The method of claim 10, wherein creating the CSTP includes:
    generating a compressed file that includes the state information.

15. The method of claim 14, wherein creating the CSTP includes:
    adding a digital signature to the compressed file, wherein adding the digital signature includes using a private key associated with the first application.

16. The method of claim 1, wherein performing the security check includes:
    inserting a hash of the state information to a permissions ledger of a blockchain.

17. The method of claim 10, wherein the CSTP includes metadata.

18. The method of claim 10, wherein the notification indicates that the first application has detected an event in which a client hosted by a User Equipment device serviced by the first application has requested the first application to transfer state information, associated with the client, from the first network device to the second network device.

19. A non-transitory computer-readable medium comprising processor-executable instructions that, when executed by one or more processors, cause the one or more processors to:
- receive, over a network, a notification at a first network device comprising a first virtualized operating system (OS) and the one or more processors;
- identify, based on the notification, a first application executing on the first virtualized OS;
- identify, based on the notification, a second network device and a second application executing on a second virtualized OS, wherein the second network device comprises the second virtualized OS;
- cause the first virtualized OS and a hypervisor to obtain state information of the first application;
- create a context state transfer package (CSTP) based on the state information;
- perform a security check to determine if the first network device is permitted to transmit the CSTP to the second network device over the network;
- forward, over the network, the CSTP to the second network device wherein the second network device is configured to:
  - receive, over the network, the CSTP from the first network device;
  - unpack the state information from the received CSTP; and
  - use the unpacked state information to put the second application executing on the second virtualized OS in a same state as the first application when the state information was obtained at the first network device.

20. The non-transitory computer-readable medium of claim 19, wherein the first network device and the second network device are included in a first Multi-access Edge Computing (MEC) cluster and a second MEC cluster, respectively.

* * * * *